United States Patent [19]

Lapshansky, Sr. et al.

[11] Patent Number: 5,172,515
[45] Date of Patent: Dec. 22, 1992

[54] IRRIGATION SYSTEM AND PORTABLE WATERING SYSTEM THEREFOR

[76] Inventors: John F. Lapshansky, Sr.; John F. Lapshansky, Jr., both of 1420 Woodbridge Dr., Unit 3E, Joliet, Ill. 60436

[21] Appl. No.: 606,427

[22] Filed: Oct. 31, 1990

[51] Int. Cl.⁵ .................................................. B05B 1/12
[52] U.S. Cl. ...................................... 47/48.5; 239/276
[58] Field of Search ................. 47/48.5, 62, 1.01; 239/276, 273, 565, 10, 310, 318

[56] References Cited

U.S. PATENT DOCUMENTS

| | | | |
|---|---|---|---|
| 1,010,819 | 12/1911 | Thompson | 47/48.5 |
| 1,925,622 | 9/1933 | Anderson . | |
| 2,214,083 | 9/1940 | Lester | 239/276 |
| 2,242,789 | 5/1941 | McFee . | |
| 2,302,799 | 11/1942 | Peterson . | |
| 2,323,773 | 7/1943 | Irish . | |
| 2,505,174 | 4/1950 | Daniels . | |
| 2,558,663 | 6/1951 | Olschewski | 239/565 |
| 3,586,239 | 6/1971 | Blass | 239/276 |
| 3,618,539 | 11/1971 | Daniels . | |
| 4,153,380 | 5/1979 | Hartman | 47/48.5 |
| 4,365,750 | 12/1982 | Carlberg | 239/276 |
| 5,020,722 | 6/1991 | Wardell | 239/276 |
| 5,050,801 | 9/1991 | Ferrari | 239/276 |

Primary Examiner—David A. Scherbel
Assistant Examiner—Michele A. Van Patten
Attorney, Agent, or Firm—Wood, Phillips, VanSanten, Hoffman & Ertel

[57] ABSTRACT

In order to improve efficiency and eliminate waste in irrigation applications, while also providing irrigation in any configuration or pattern in an inexpensive manner, an irrigation system includes a plurality of portable watering stations. The watering stations are adapted to be positioned at selected locations to achieve a predetermined watering pattern. Each of the watering stations includes a hollow body having at least one port adapted to receive water either directly or indirectly from a water source, at least two ports adapted to distribute water received therein directly to a pair of other watering stations, and an irrigation component associated with the body for irrigating an area immediately surrounding the watering station. The watering stations are adapted to be interconnected with one another and a water source by utilizing a plurality of hoses. In this manner, the irrigation system is portable, movable and expandable and may be provided in kit form so as to accomplish the objective of watering in the most economical, efficient and waste-free fashion possible.

36 Claims, 2 Drawing Sheets

IRRIGATION SYSTEM AND PORTABLE WATERING SYSTEM THEREFOR

FIELD OF THE INVENTION

The present invention is directed generally to irrigation systems and, more particularly, a portable, movable and expandable irrigation system.

BACKGROUND OF THE INVENTION

Generally speaking, it has been well known to utilize a variety of irrigation systems The devices which are currently available, however, have been able to water and feed plant root systems only to a very limited degree, or within a restricted area. Primarily, this has been due to the fact that such devices usually comprise single units In this connection, most such devices are designed to have a single port for attaching a water feeder hose. Thus, due to the limited watering area achievable with a single unit, it has been necessary to move the unit to various locations which involves not only a very slow, time consuming process, but one which is quite inefficient and wasteful. Without question, there has been no irrigation system which is portable, movable and expandable.

As for irrigation systems, one of the most popular has been the conventional lawn sprinkler. It is generally well known, however, that lawn sprinklers typically do not have the capability of fertilizing or feeding a lawn and, even more importantly, they are highly inefficient and wasteful inasmuch as up to 80% of the water from a sprinkler will be lost to evaporation on a sunny day. Still further, the water can easily be diverted from its target on a breezy day.

In addition, a conventional lawn sprinkler is fundamentally unsound for its intended purpose in at least one key respect. It is known that in order to develop grass (or other plants) having deep, strong roots, it is necessary for water to reach the area around and below the roots, i.e., it is essential to avoid "shallow" watering which may otherwise develop shallow roots. Of course, lawn sprinklers must therefore deliver a significant quantity of water in order to achieve this through a long, thorough soaking.

Moreover, due to the evaporation problem noted hereinabove, lawn sprinklers are known to be most efficient only at certain times. Specifically, it has been established that early morning is the best time to water inasmuch as mornings are usually cool and moist in contrast to later in the day when the sun, temperature and breeze can further enhance evaporation. Unfortunately, it is a known fact that many persons find this time of day to be inconvenient for watering the lawn or other plants.

In order to overcome these problems, it has been known to install automatic water sprinkling systems which typically utilize a permanently installed network of underground piping. These systems are extremely expensive, however, and are also subject to high maintenance costs due to freezing damage, construction interference, damage during plant cultivation, rodent vandalism, and damage to above ground sprinkler heads via lawn mowing equipment. Even more importantly, the utilization of above-ground sprinkler heads does not begin to address the previously noted problems associated with above-ground sprinkling inefficiencies.

More recently, there have also been developed what are commonly known as root feeders for trees, bushes and the like. These are provided as single units which are attached to a water source by means of a hose and extend deep into the ground to deliver water and food to individual plants at root level. However, such root feeders must frequently be relocated in order to ensure feeding of the entire root system of large plants.

The present invention is directed to overcoming one or more of the foregoing problems and achieving one or more of the resulting objects.

SUMMARY OF THE INVENTION

It is a principal object of the present invention to provide an improved irrigation system. It is a further object of the present invention to provide an entirely portable, movable and expandable irrigation system which may be in kit form. It is an additional object of the present invention to provide a portable watering station therefor.

Accordingly, the present invention is directed to an irrigation system which includes a plurality of hoses and portable watering stations The watering stations are adapted to be positioned at selected locations to achieve a predetermined watering pattern. Each of the watering stations includes a hollow body having at least one port adapted to receive water either directly or indirectly from a water source, at least two ports adapted to distribute water received therein directly to a pair of other watering stations, and means associated with the body for irrigating an area immediately surrounding the watering station. The hoses are adapted to interconnect the water source with the watering stations and the watering stations to one another. In a highly preferred embodiment, the irrigation system takes the form of a portable, movable and expandable kit.

Preferably, the irrigating means includes a separate hollow tube in fluid communication with each of the hollow bodies of the various watering stations. The hollow tubes each have a plurality of holes therein for receiving and dispensing water from the respective one of the hollow bodies. Further, the hollow tubes are adapted to be inserted into the ground for placement of the holes below the surface of the ground for direct underground root irrigation.

As for the hollow tubes, they are advantageously removably securable to any one of the hollow bodies about a dispensing port thereof. The hollow tubes are also preferably generally conically shaped to facilitate insertion into the ground for underground irrigation and, if desired, some of the hollow tubes are of one length while others are of another length in order to facilitate watering and/or feeding root systems at different depths. Alternatively, the hollow tubes may be formed so as to be integral with the corresponding one of the hollow bodies about a dispensing port thereof.

In the exemplary embodiment, the hoses and hollow bodies include corresponding mating engagement means associated therewith. The mating engagement means may, in one form of the invention, include matingly engageable threads formed on the hoses and the hollow bodies. Alternatively, the mating engagement means may include quick connect/disconnect means formed on the hoses and the hollow tubes.

Further, the hollow bodies may each advantageously include an accessory port in addition to the water receiving and distributing ports. The irrigating means may then include a sprinkler assembly removably securable to any one of the hollow bodies about the accessory port thereof or, if desired, a plant food bulb may be provided which is likewise removably securable. In addition, a plurality of caps will be provided for selectively sealing the accessory ports for any of the watering stations when not being used.

In a most highly preferred embodiment, the hollow bodies are generally rectangular in shape. They are then formed so as to include four faces at right angles to one another with the water receiving port being located in one of the faces. Advantageously, a water distributing port is formed at each of the other three faces.

As a further alternative, the hollow bodies may be formed sufficiently large to receive plant food directly therein. In this manner, the need for a plant food bulb can be eliminated while still providing the capability of not only watering but also feeding plants at root level and/or through a sprinkler assembly. In order to vary the watering pattern, it may also be advantageous to provide a plurality of hoses of varying lengths.

Other objects, advantages and feature of the present invention will become apparent from a consideration of the following specification taken in conjunction with the accompanying drawings.

DETAILED DESCRIPTION OF THE PREFERRED EMBODIMENTS

Figure 1:
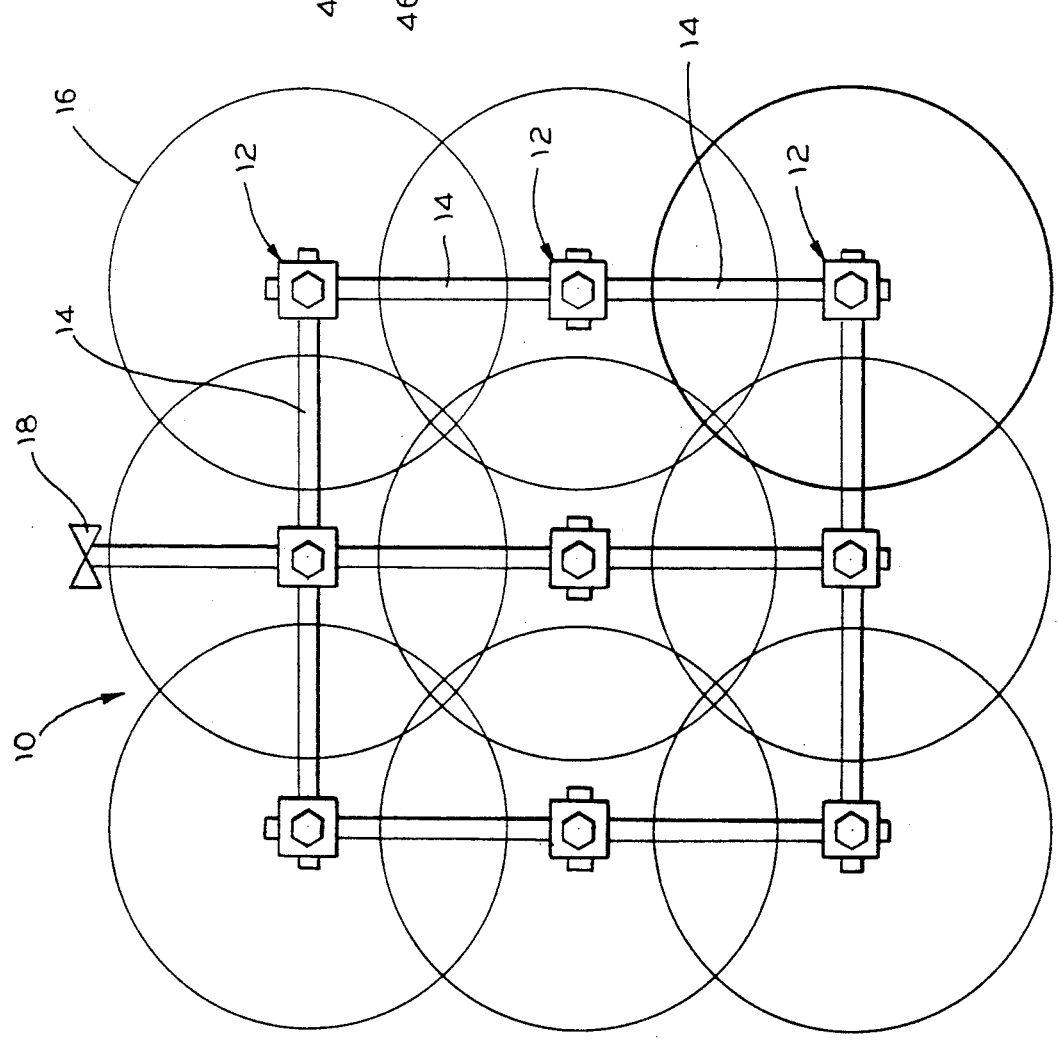
FIG. 1 is a largely schematic plan view of an irrigation system according to the present invention.

In the illustrations given, and with reference first to FIG. 1, the reference numeral 10 designates generally a portable, movable and expandable irrigation system which may advantageously be provided in kit form to include a plurality of portable watering stations generally designated 12 and a plurality of hoses 14. As will be seen, the portable watering stations 12 are adapted to be positioned at selected locations to achieve a predetermined watering pattern 16 and the hoses 4 are adapted to interconnect a water source 18 with the watering stations 12 and the watering stations 12 to one another for watering in the predetermined watering pattern 16.

Figure 2:
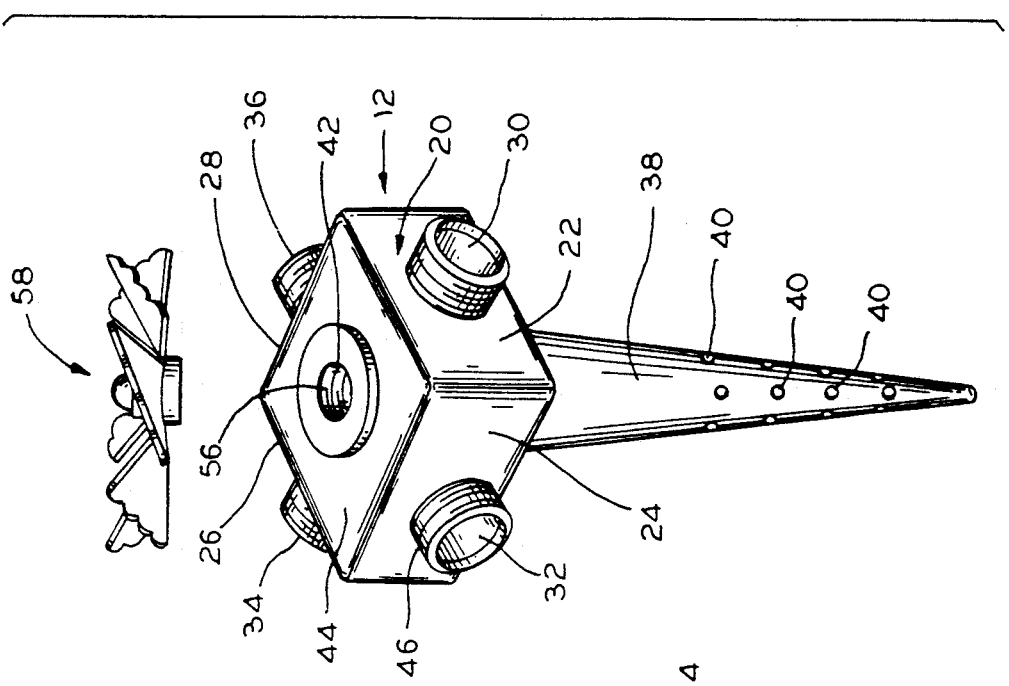
FIG. 2 is a perspective view of a portable watering station of the irrigation system illustrated in FIG. 1.

Referring to FIG. 2, the watering stations 12 each include a generally rectangular or cubical hollow body 20 having four faces 22, 24, 26 and 28 at right angles to one another with one port such as 30 in one of the faces 22 adapted to receive water either directly or indirectly from the water source 18 and another port such as 32, 34 and 36 in each of the other of the faces 24, 26 and 28 adapted to distribute water directly to a plurality of other watering stations 12. It will also be seen that each of the watering stations 12 includes means such as a hollow tube 38 associated with the body 20 for irrigating an area immediately surrounding the water station 12. In this connection, the hollow tube 38 is adapted for fluid communication with the hollow body 20, has a plurality of holes 40 therein for receiving and dispensing water from the hollow body 20 to the root systems of plants, and is generally conically shaped to facilitate insertion into the ground for placement of the holes 40 below the surface of the ground for direct underground root irrigation.

In one form of the invention the hollow tubes 38 are removably securable to any one of the hollow bodies 20 about a dispensing port thereof The dispensing ports while not shown, may advantageously be identical to the accessory ports 42 formed in the top walls 44 of the hollow bodies 20, in which case the hollow tubes 38 may be removably securable by means of matingly engageable threads Alternatively, the hollow tubes 38 may be formed so as to be integral with a corresponding one of the hollow bodies 20.

Whether the hollow tubes 38 are removably securable to or integral with the hollow bodies 20, the irrigation system 20 may advantageously include some tubes 38 of one length and others of another length. This thereby facilitates utilization of the kit for a variety of different watering and/or feeding applications inasmuch as different plants have roots of widely varying depths. Also, for purposes of providing maximum flexibility as to the predetermined watering pattern 16, the hoses 14 may be provided with some of one length and others of another length.

Figure 4:
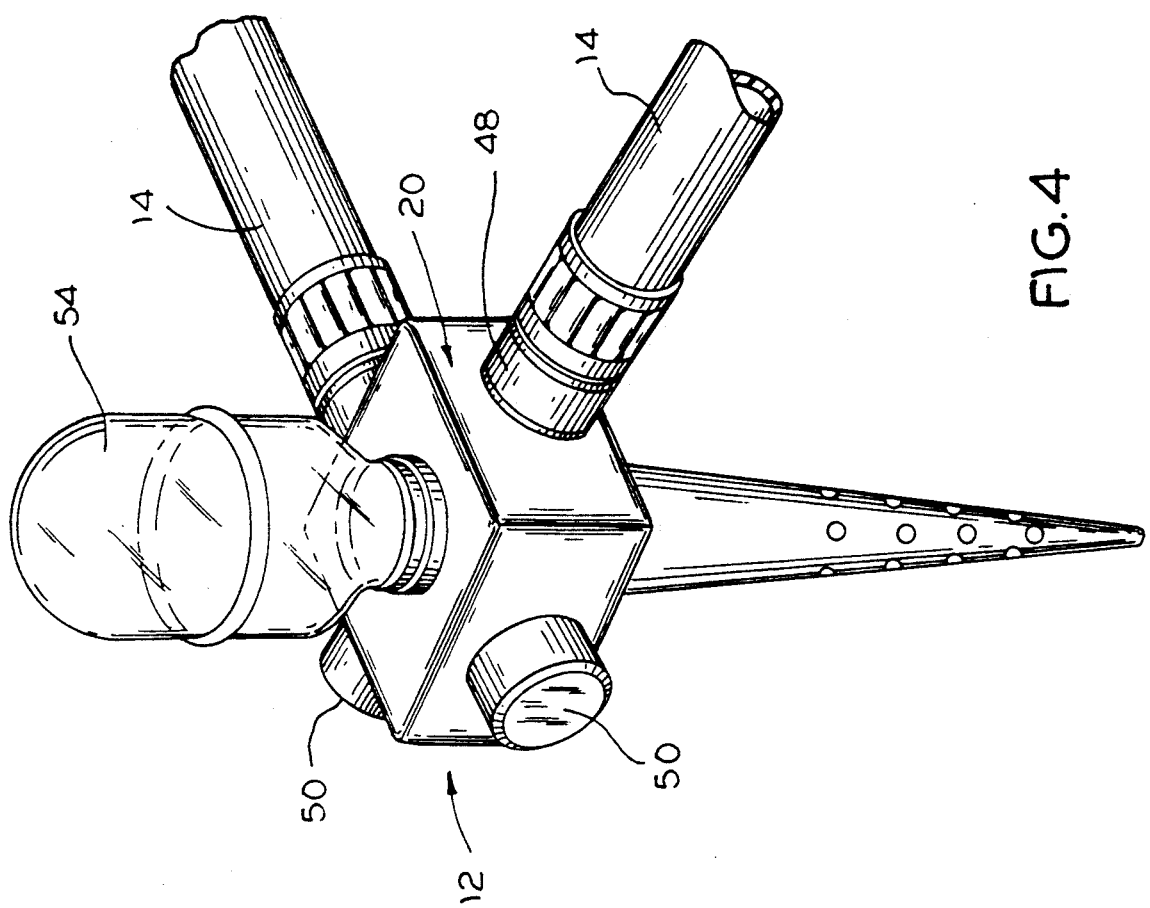
FIG. 4 is a perspective view of a portable watering station with a plant bulb in an accessory port.
Figure 3:
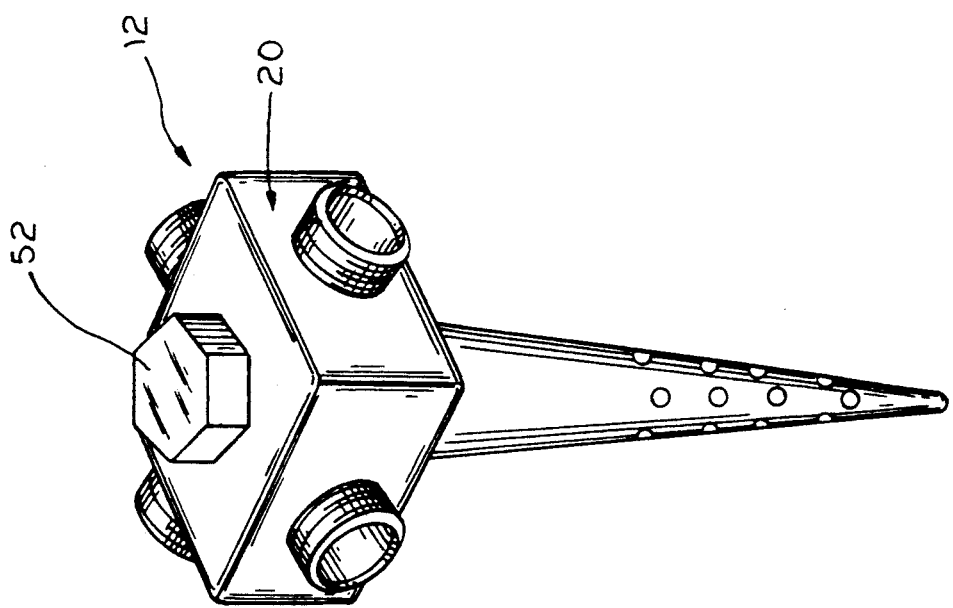
FIG. 3 is a perspective view of a portable watering station with a cap in an accessory port.

As will be appreciated by referring to FIGS. 2 through 4, the hoses 14 and hollow bodies 20 are advantageously formed to include corresponding mating engagement means associated therewith This may, in one form of the invention, take the form of matingly engageable threads such as the male threads 46 formed on tubular extensions on the hollow bodies 20, in which case there will be corresponding female threads (not shown) within the hose coupling fittings 48 at each end of each of the hoses 14 (it being understood that the hollow bodies 20 could alternatively be provided with female threads in which case the hose coupling fittings 48 would have male threads for mating engagement therewith). Alternatively, the hoses 14 and hollow tubes 20 may be formed to include quick connect/disconnect means such as the snap connect hose coupling fittings that are available from the L.R. Nelson Corporation.

As best shown in FIG. 4, the irrigation system 10 will advantageously include a plurality of caps 50 for selectively sealing one or more of the water distributing ports such as 32, 34 and 36 for any of the watering stations 12. It will also be seen from FIG. 3 that, in kit form, the irrigation system 10 will include a plurality of caps 52 for selectively sealing one or more of the accessory ports 42 for any of the watering stations 12. In addition and/or alternatively, the irrigation system 10 may include a plurality of plant food bulbs 54 each of which is removably securable to any one of the hollow bodies 20 about the accessory port 42 thereof.

When utilized, the plant food bulbs 54 may advantageously be formed so as to include male threads (not shown). These male threads will be formed to be matingly engageable with the female threads 56 in the hollow bodies 20 about the accessory ports 42 thereof. Alternatively, the hollow bodies 20 may simply be sized sufficiently to permit insertion of plant food pellets directly thereinto.

As an additional accessory, or if desired as a primary irrigating means, a sprinkler 58 may be provided (see FIG. 2). The sprinkler 58 is advantageously removably securable to any one of the hollow bodies 20 (or all of them in the event a plurality of such sprinklers is provided), and it is adapted to be secured about the accessory port 42 thereof which, when provided with female threads 56, may be accomplished by means of corresponding matingly engageable male threads (not shown). By offering this alternative, the versatility of the irrigation system 10 is still further enhanced.

As should now be appreciated, the present invention provides not only an entirely unique irrigation system but also an improved portable watering station. This represents a distinct and important advancement in the field of plant watering and feeding devices and is unique from any similar device or system presently known to be available since it provides the flexibility to build a universal, movable plant watering/feeding system that is expandable in kit form to handle an individual plant, multi-plants, a complete floral or vegetable garden, and complete lawns. As will be appreciated, this flexibility is accomplished in a manner making it possible to develop infinite watering sizes and/or patterns.

Still further, the irrigation system can be moved to cover multiple areas, or expanded by increasing the number of watering stations to fit with practical needs. Devices previously available are able to water and/or feed plant root systems only to a very limited degree or within a restricted area, as single units As will be recognized, such units conventionally have a single port for direct attachment of a single water feeder hose.

In contrast, the present invention provides a universal, expandable, portable plant root watering/feeding system. This is accomplished with a device which may be formed of metal and/or plastic and in which the hollow watering tube may simply be inserted into the soil and/or a sprinkler utilized as to each of a plurality of watering stations. By simply hooking up the hose connections, placing the water stations as desired, and turning on the water supply, a predetermined watering pattern can be achieved.

With the present invention, the irrigation system is much more efficient than above ground sprinklers. It provides the root systems immediately and directly with water and/or nutrition via capillary action. Importantly, it eliminates the problem of waste due to evaporation and run-off.

While in the foregoing there have been set forth preferred embodiments of the invention, it will be appreciated that the details herein given may be varied by those skilled in the art without departing from the true spirit and scope of the present invention.

We claim:

1. An irrigation system, comprising:
  a plurality of portable watering stations adapted to be positioned at selected locations to achieve a predetermined watering pattern, each of said watering stations including:
  a hollow body having at least one port adapted to receive water either directly or indirectly from a water source, at least two ports adapted to distribute water received therein directly to a pair of other watering stations and said hollow body further including means independent of said water receiving and distribution ports for securing said hollow body in the ground, and said means associated with said hollow body to irrigate an area immediately surrounding said watering stations;
  said ports all being disposed in said hollow body about the perimeter thereof; and
  a plurality of hoses adapted to interconnect said water source with said watering stations and said watering stations to one another for watering in said predetermined watering pattern.

2. The irrigation system of claim 1 wherein said irrigating means include a hollow tube in fluid communication withe ach of said hollow bodies, said hollow tubes each having a plurality of holes therein for receiving and dispensing water from the respective one of said hollow bodies, said hollow tubes being adapted to be inserted into the ground for placement of said holes below the surface of the ground for underground irrigation.

3. The irrigation system of claim 1 wherein each of said hoses and said hollow bodies include corresponding mating engagement means associated therewith.

4. The irrigation system of claim 1 including a plurality of caps for selectively sealing said water distributing ports for any of said watering stations.

5. The irrigation system of claim 1 wherein each of said hollow bodies also includes an accessory port in addition to said water receiving and distributing ports.

6. The irrigation system of claim 1 wherein each of said hollow bodies is generally rectangular in shape and includes four faces at right angles to one another.

7. The irrigation system of claim 6 wherein said water receiving port is in one of said faces and including a water distributing port in each of the other of said faces.

8. A portable, movable and expandable irrigation system, comprising:
  a plurality of portable watering stations adapted to be positioned at selected locations to achieve a predetermined watering pattern, each ofs aid watering stations including:
  a hollow body having at least one port adapted to receive water either directly or indirectly from a water source, at least two ports adapted to distribute water received therein directly to a pair of other watering stations and said hollow body furthe rincluding means independent of said water receiving and distribution ports for securing said hollow body in the ground, and said means associated with said body for irrigating an area immediately surrounding said watering station;
  said ports all being disposed in said hollow body about the perimeter thereof;
  said irrigating means including a hollow tube in fluid communication with each of said hollow bodies, said hollow tubes each having a plurality of holes therein for receiving and dispensing water from the respective one of said hollow bodies, said hollow tubes being adapted to be inserted into the ground for placement of said holes below the surface of the ground for underground irrigation;
  a pluraliyt of hoses adapted to interconnect said water source with said watering stations and said watering stations to one another for watering in said predetermined watering pattern whereine ach of said hoses and said hollow bodies are formed to include corresponding mating engagement means associated therewith; and
  a plurality of caps for selectively sealing said water distributing ports for any of said watering stations.

9. The irrigation system of claim 8 wherein each of said hollow tubes is removably securable to any one of said hollow bodies about a dispensing port thereof.

10. The irrigation system of claim 8 wherein each of said hollow tubes is integral with a corresponding one of said hollow bodies about a dispensing port thereof.

11. The irrigation system of claim 8 wherein each of said hollow tubes is generally conically shaped to facilitate insertion into the ground for underground irrigation.

12. The irrigation system, of claim 8 wherein at least some of said hollow tubes are of one length and others of said hollow tubes are of another length.

13. The irrigation system of claim 8 wherein said mating engagement means includes matingly engageable threads formed on said hoses and said hollow bodies.

14. The irrigation system of claim 8 wherein said mating engagement means includes quick connect/disconnect means formed on said hoses and said hollow tubes.

15. The irrigation system of claim 8 wherein some of said hoses are of one length and others of said hoses are of another length.

16. The irrigation systen of claim 8 wherein each of said hollow bodies also includes an accessory port in addition to said water receiving and distributing ports.

17. The irrigation system of claim 16 including a plurality of caps for selectively sealing said accessory ports for any of said watering stations.

18. The irrigation systen of claim 8 wherein each of said hollow bodies is generally rectangular in shape and includes four faces at right angles to one another.

19. The irrigation system of claim 18 wherein said water receiving port is in one of said faces and including a water distributing port in each of the other of said faces.

20. A portable, movable and expandable irrigation system in kit form, comprising:
a plurality of portable watering stations adapted to be positioned at selected locations to achieve a predetermined watering pattern, each of said watering stations including:
a generally rectangular hollow body having four faces at right angles to one another with one port in one of said faces adapted to receive water either directly or indirectly from a water source and another port in each of the other of said faces adapted to distribute water directly to a plurality of other watering stations, and means associated with said body for irrigating an area immediately surrounding said watering station, said irrigating means including a plurality of hollow tubes adapted for fluid communication with one of said hollow bodies, said hollow tubes each having a plurality of holes therein for receiving and dispensing water from the respective one of said hollow bodies, said hollow tubes being generally conically shaped to facilitate insertion into the ground for placement of said holes below the surface of the ground for underground irrigation, each of said hollow tubes being removably securable to any one of said hollow bodies about a dispensing port thereof;
a plurality of hoses adapted to interconnect said water source with said watering stations and said watering stations to one another for watering in said predetermined watering pattern wherein each of said hoses and said hollow bodies are formed to include corresponding mating engagement means associated therewith; and
a plurality of caps for selectively sealing said water distributing ports for any of said watering stations.

21. The irrigation system of claim 20 wherein each of said hollow tubes and hollow bodies include corresponding mating engagement means associated therewith.

22. The irrigation system of claim 21 wherein said mating engagement means includes matingly engageable threads formed on said hollow tubes and hollow bodies.

23. The irrigation system of claim 20 wherein at least some of said hollow tubes are of one length and others of said hollow tubes are of another length.

24. The irrigation system of claim 20 wherein said mating engagement means includes matingly engageable threads formed on said hoses and said hollow bodies.

25. The irrigation system of claim 20 wherein said mating engagement means includes quick connect/disconnect means formed on said hoses and said hollow tubes.

26. The irrigation system of claim 20 wherein some of said hoses are of one length and others of said hoses are of another length.

27. The irrigation system of claim 20 wherein each of said hollow bodies also includes an accessory port in addition to said water receiving and distributing ports.

28. The irrigation system of claim 27 wherein said irrigating means includes a sprinkler removably securable to any one of said hollow bodies about said accessory port thereof.

29. The irrigation system of claim 27 including a plant food bulb removably securable to any one of said hollow bodies about said accessory port thereof.

30. The irrigation system of claim 27 including a plurality of caps for selectively sealing said accessory ports for any of said watering stations.

31. A portable watering station adapted to be positioned at any preselected location, comprising:
a hollow body having at least one port adapted to receive water either directly or indirectly from a water source, at least two ports adapted to distribute water received therein directly to a pair of other watering stations and said hollow body further including means independent of said water receiving and distribution ports for securing said hollow body in the ground, and said means associated with said hollow body to irrigate an area immediately surrounding said watering station;
said ports all being disposed in said hollow body about the perimeter thereof.

32. The portable watering station of claim 31 wherein said irrigating means include a hollow tube in fluid communication with each of said hollow bodies, said hollow tubes each having a plurality of holes therein for receiving and dispensing water from the respective one of said hollow bodies, said hollow tubes being adapted to be inserted into the ground for placement of said holes below the surface of the ground for underground irrigation.

33. The portable watering station of claim 31 including a plurality of caps for selectively sealing any of said water distributing ports.

34. The portable watering station of claim 31 wherein said hollow body also includes an accessory port in addition to said water receiving and distributing ports.

35. The portable watering station of claim 31 wherein said hollow body is generally rectangular in shape and includes four faces at right angles to one another.

36. The irrigation system of claim 35 wherein said water receiving port is in one of said faces and including a water distributing port in each of the other of said faces.

* * * * *